United States Patent [19]

Acda

[11] 3,998,578
[45] Dec. 21, 1976

[54] MANDRIL FOR SHAPING A BELL END ON A PIPE OF THERMO-PLASTIC MATERIAL

[75] Inventor: Petrus Marinus Acda, Enkhuizen, Netherlands

[73] Assignee: Polva-Nederland B.V., Enkhuizen, Netherlands

[22] Filed: May 28, 1975

[21] Appl. No.: 581,707

Related U.S. Application Data

[63] Continuation of Ser. No. 408,562, Oct. 23, 1973, abandoned.

[30] Foreign Application Priority Data

Apr. 5, 1973 Netherlands ............ 7304761

[52] U.S. Cl. .................. 425/393; 425/457; 425/DIG. 218
[51] Int. Cl.² ........................... B29C 17/00
[58] Field of Search ......... 425/DIG. 218, 392, 393, 425/384, 457

[56] References Cited

UNITED STATES PATENTS 3,484,900  12/1969  Sands et al. .............. 425/393
3,520,047  7/1970  Muhlner ..................... 264/92
3,749,543  7/1973  Stanbury ............ 425/DIG. 218
3,836,622  8/1974  Sporre ............... 425/DIG. 218

FOREIGN PATENTS OR APPLICATIONS 2,061,899  12/1970  Germany ................ 425/393

Primary Examiner—Richard B. Lazarus
Assistant Examiner—R. J. Charvat
Attorney, Agent, or Firm—Frank R. Trifari; David R. Treacy

[57] ABSTRACT

A mandril for shaping a bell end on a pipe of thermoplastic material, having an elastic shaping ring which is expanded radially in an operative position during the shaping of the bell end and which can be removed from the bell end by radial contraction. The mandril assembly comprises a plurality of parts which are profiled and slidable with respect to each other such that in the operative position the shaping ring is locked radially and axially, and in the removal position the shaping ring can retreat into a chamber formed between the slidable parts.

6 Claims, 5 Drawing Figures

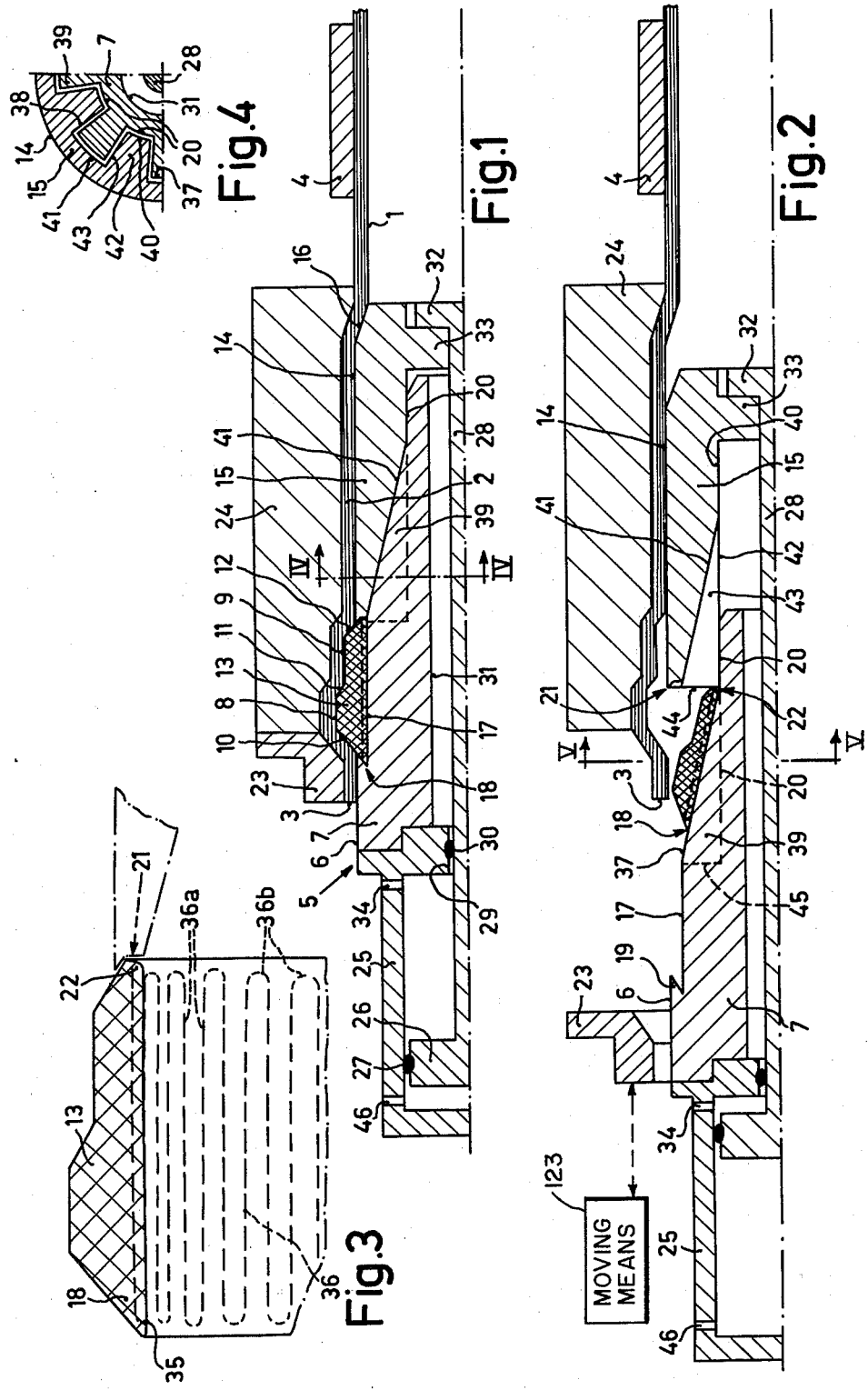

MANDRIL FOR SHAPING A BELL END ON A PIPE OF THERMO-PLASTIC MATERIAL

This is a continuation of application Ser. No. 408,562, filed Oct. 23, 1973, and now abandoned.

The invention relates to an apparatus for shaping a bell end on a pipe of thermoplastic material, the opening of the bell end having a diameter which is smaller than the maximum diameter of the inner surface of the bell end and substantially equal to the outer diameter of the pipe, by means of a cylindrical shaping mandril which is to be axially inserted into the pre-heated pipe end.

In an apparatus of this kind from U.S. Pat. No. 3,853,450 issued Dec. 10, 1974 to the instant applicant, the shaping mandril comprises a base part, a shaping ring of deformable material slidable on the base part and a sleeve part slidable with respect to the base part, said base and sleeve parts being profiled such that in the operative position of the shaping mandril, the shaping ring is locked against axial and radial deformation in an annular chamber formed between the base part and the sleeve part, the outer surface of the shaping mandril having cylindrical portions of step-like varying diameters with conical transition portions. The shaping ring to comprises at least one cylindrical portion having a diameter which is larger than the outer diameter of the pipe, the base part and the sleeve part having a cylindrical portion whose diameter is substantially equal to the outer diameter of the pipe, the sleeve part having a conical front portion adjoining the cylindrical portion thereof and which is forwards and radially inwards inclined, the smallest diameter thereof being at the most equal to the inner diameter of the pipe.

The bell end is then formed by relative axial movement between the shaping mandril in said operative position and the pipe, resulting in a step-wise expansion of the pre-heated pipe material. By means of an external tool, consisting for example of a pressure ring which can be coaxially secured with respect to the shaping mandril and a split, initially open shaping sleeve, the pressure ring abuts against the shaping sleeve in a given relative position of shaping mandril and pipe, the shaping sleeve being subsequently clamped about the pipe end. In order to release the shaping mandril, first the clamping between the two metal mandril parts is removed; and subsequently the base part of the shaping mandril, and after that the shaping ring and the sleeve part, are axially removed from the bell end formed.

Using the described known apparatus, after the interior of the bell end has been made accessible by removal of the base part of the shaping mandril therefrom, the deformable shaping ring is first removed, using a suitable tool, from the bell end which has meanwhile cooled, and is subsequently slid by hand onto the base part again. After that, the sleeve part of the shaping mandril is removed from the bell end by means of a hook-like tool which can engage behind the sleeve part inside the bell end and which also serves, in the active position of the shaping mandril, for keeping the metal mandril parts clamped together, after which the shaping mandril can be brought into the active position again by means of said tool.

The object of the invention is to provide an apparatus in which the mandril parts can be removed from a formed bell end in a completely mechanical manner, so that pipe manufacturing can be carried out faster.

The apparatus comprises a cylindrical shaping mandril and a pipe clamp, supported to be axially movable relative to each other on a frame, said shaping mandril having a base part, a deformable expandable shaping ring slidable on the base part, a sleeve part which is slidable with respect to the base part, and pressure means movable with respect to the shaping mandril for clamping the shaping ring between the base part and the sleeve part in the operative position of the shaping mandril.

According to he invention, the maximum outer diameter of the shaping ring in its relaxed state is smaller than the largest diameter of the base part, the inner diameter of the shaping ring being at least equal to the smallest diameter of the base part. The sleeve part is provided on its rear end with segment-like ribs and recesses which, when sliding over the base part, cooperate with complementary, segment-like recesses and ribs on the base part. The ribs on the base part form part of a conical, forward inclined outer surface extending from the largest to the smallest diameter, while the recesses in the sleeve part have a corresponding, conically inclined inner surface, the radial end faces of the recesses in the base part constituting an abutment which limits the displacement of the sleeve part, whilst the radial end faces of the ribs on the sleeve part constitute a thrust face for the shaping ring.

In the apparatus according to the invention, the conically declined outer surface on the base part formed by the ribs facilitates the retreat of the shaping ring into the clearance when the metal shaping mandril portions move apart, while the end edges of the ribs on the sleeve part abut the front part of the shaping ring so as to drive this ring along the ribs on the base part when the shaping mandril is put into its operative position again.

The shaping ring is deformed to only a minor extent and only in the radial direction. In contrast with other known methods, in which the shaping ring is forced out of the bell end while being substantially deformed, in the method according to the invention the shaping ring is subjected to only minor forces, just sufficient to overcome the friction between shaping ring and shaping mandril.

The invention furthermore relates to an embodiment of the apparatus in which the shaping ring is supported by a spring member. The radial contraction of the shaping ring is thus facilitated and durably maintained.

In a preferred embodiment of the apparatus according to the invention, the spring member has a cylindrical shape and is embedded near the inner surface of the shaping ring. The embedded cylindrical spring member thus reinforces and supports the shaping ring over the entire circumference.

In a further preferred embodiment of the apparatus according to the invention, the spring member consists of a steel wire which is formed into a closed wave-line with constant wavelength and amplitude, the wave crests being situated near the side edges of the shaping ring. As a result, a uniform spring action is exerted by the spring element on the shaping ring.

In another embodiment of the apparatus according to the invention, the spring member is connected to the material of the shaping ring by vulcanizing.

The invention furthermore relates to a shaping ring of an elastic material which is to be used with apparatus according to the invention. A cylindrical spring member, embedded near the inner surface of the shaping ring consists of a steel wire which is formed into a closed wave-line with constant wavelength and amplitude, the wave crests being situated near the end edges of the shaping ring, the spring member being connected to the material of the shaping ring by vulcanizing.

The invention furthermore relates to a shaping mandril, provided with a shaping ring as described above, for use in an apparatus as described above.

The invention will be described in detail hereinafter with reference to an embodiment which is diagrammatically shown in the drawing.

FIG. 1 is a longitudinal sectional view of an embodiment of the apparatus according to the invention which is shown at the instant at which a bell end has been formed on a pipe, the lower half of the apparatus having been omitted for the sake of simplicity.

FIG. 2 is a similar sectional view of the apparatus, shown in a subsequent phase of the process.

FIG. 3 is a longitudinal sectional view of a portion of the shaping ring at an increased scale.

FIG. 4 is a longitudinal sectional view of the shaping mandril according to the line IV—IV in FIG. 1.

Figure 5:
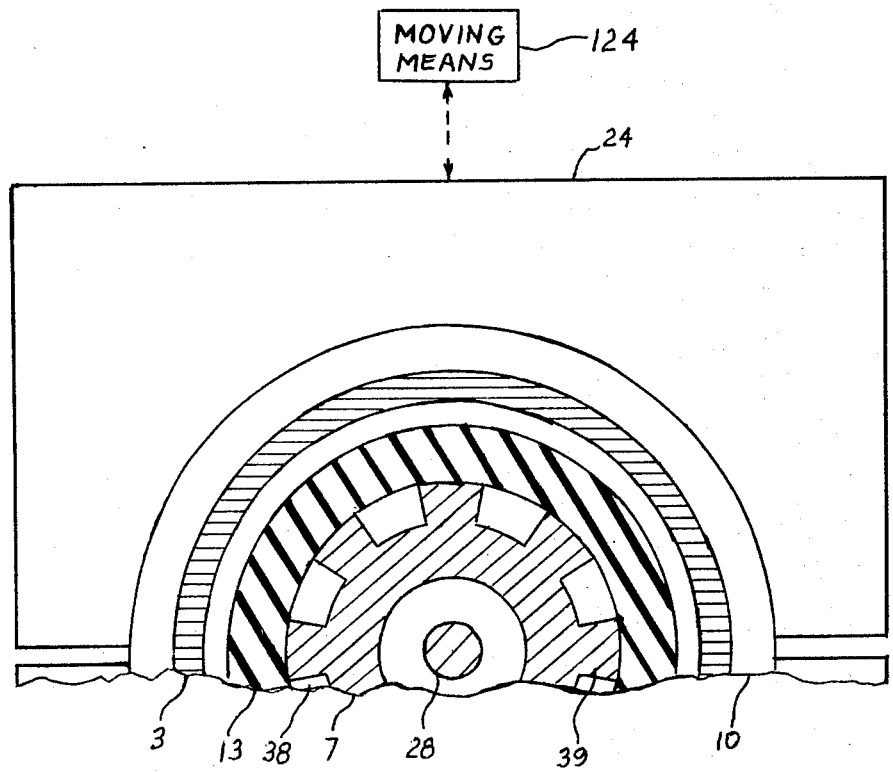
FIG. 5 is an enlarged partial cross-sectional view of the apparatus according to the line V—V in FIG. 2.

The apparatus shown in the drawing serves for shaping a bell end 2 on a pipe 1 of thermoplastic material, the inner surface of the bell end 2 locally having a diameter which is larger than the outer diameter of the pipe 1 adjoining the bell end 2 in order to accommodate a sealing ring (not shown) at a latter stage between the bell end and a spigot to be coupled thereto. The opening 3 and the rear part of the bell end, in order to fix the seal therein, has a diameter which is slightly larger than the outer diameter of the original pipe 1.

The pipe 1 is secured in a longitudinally split clamp 4 such that its pre-heated end 2 extends therebeyond. A cylindrical shaping mandril, generally denoted by 5 and supported by the frame coaxially with the pipe clamp 4, and the clamp 4 are moved towards each other after the shaping mandril has been assembled in a manner to be described hereinafter, the heated pipe end then being deformed into the bell end 2 shown while sliding over the shaping mandril 5. The pipe clamp 4 can be connected to the stationary frame, the shaping mandril then being axially movable with respect to the frame.

The shaping mandril 5 has a cylindrical outer surface of step-wise varying diameter, the transitions between neighbouring cylindrical surfaces of different diameter being conical. The shaping mandril 5 consists of a metal base part 7 having a cylindrical surface 6 the diameter of which is slightly larger than the outer diameter of the pipe 1; a shaping ring 13 of rubber or similar elastic material with two cylindrical surfaces 8,9 the diameter of which is larger than the outer diameter of the pipe 1 and with conical portions 10, 11, 12; and a metal sleeve part 15 having a cylindrical surface 14 whose diameter is slightly larger than the outer diameter of the pipe 1, and also having a conically declined surface 16.

The shaping ring 13 is first slid over a cylindrical surface 17, having a diameter smaller than that of the rear surface 6, on the base part 7 until its profiled rear edge 18 engages a complementary profiled edge 19 (FIG. 2) on the base part 7, the edge 19 also serving as an abutment preventing further movement of the shaping ring. The sleeve part 15 is subsequently slid over a cylindrical surface 20, having a diameter smaller than that of the surface 17, onto the base part until a profiled edge 21 (FIG. 3) on the sleeve part engages the complementary profiled front edge 22 of the shaping ring 13; in this position further sliding of the sleeve part 15 is prevented as said sleeve part then just abuts against a radial abutment 45 on the base part 7.

Therefore, the shaping mandril 5 is provided with means by which — prior to the relative movement of shaping mandril and pipe for shaping the bell end 2 thereon — the shaping ring can automatically be brought into its operative position on the shaping mandril in an annular chamber formed by the base part 7 and the sleeve part 15; in this position the shaping ring 13 is locked against radial deformation as well as axial deformation by the overlapping edge portions 18 and 19 on shaping ring and base part 7, respectively, on the one side, and by the overlapping edge portions 22 and 21 on shaping ring and sleeve part 15, respectively, on the other side; the sleeve part 15 is then just abutting against a radial abutment 45 which is formed between the cylindrical surfaces 17 and 20 of the base part 7 (to be described in detail hereinafter).

The apparatus is furthermore provided with pressure means for keeping the sleeve part 15 pressed against the base part 7 as will be described hereinafter.

When the shaping mandril 5 and the pipe clamp 4 are moved towards each other, to the position shown in FIG. 1, the bell end can be pressed in known manner, for example, by means of an external tool, against the outer surface of the shaping mandril, with the result that the inner surface of the bell end adopts the shape of the mandril in an accurately calibrated manner. The part of the bell end 2 adjoining the bell end opening 3 can be pressed, for example, by means of a pressure ring 23 moved by a moving means 123 which may be an actuator of any well-known kind, and the remaining part of the bell end 2, comprising the cylindrical portions of larger diameter, can be pressed by means of a longitudinally split shaping sleeve 24 operated by a moving means 124 which may be an actuator of any well-known kind, which adjoins the pressure ring 23 and which is arranged at a given distance from the pipe clamp 4.

After the described step has been carried out, the shaping mandril 5 must be removed from the bell end 2 which has meanwhile cooled down sufficiently; however in this position the shaping ring 13 is locked in the bell end 2 by the bell end opening 3 which extends radially inwards as far as the outer rear surface 6 of the base part 7.

The apparatus according to the invention enables mechanical and automatic removal of the shaping mandril, notably the shaping ring being removed in a simple manner.

To this end, the shaping mandril 5 is supported to be axially movable on the frame of the apparatus by means of a cylinder 25 which is coaxially arranged in the prolongation of the base part 7 and which is connected thereto. A piston rod 28 of a piston 26 provided with seal 27, and which is reciprocatable inside the cylinder 25, extends axially outwards through an opening 29 with seal 30 in the end wall of the cylinder 25, through a coaxial bore 31 of the base part 7 and terminates in a radial collar 32. In the position shown in FIG. 1, this collar 32 engages a flange 33 which extends radially inwards on the foremost end of the sleeve part 15 which is slidable over the surface 20 of the base part 7, thus keeping the sleeve part rigidly pressed against the base part when pressure medium is admitted into the cylinder 25 via a port 34. The cylinder 25, the piston 26, and the piston rod 28 which engages the flange 33 by way of the collar 32 thus constitute the pressure means for keeping the sleeve part 15 pressed against the base part 7.

In the embodiment of the apparatus shown, the rubber shaping ring 13 is provided with a metal spring member. To this end, a steel wire 36 (see FIG. 3) is embedded in the rubber material by vulcanizing near the cylindrical inner surface 35 of the shaping ring, the wire having the shape of a closed wave-line 36a with a constant amplitude, the wave crests 36b thereof being situated near the profiled edges of the shaping ring.

The dimensions of the shaping ring 13 shown at an increased scale in FIG. 3 have been chosen such that in the relaxed state of the shaping ring its largest outer diameter is smaller than the smallest inner diameter of the bell end formed, and thus also smaller than the largest diameter of the metal shaping mandril portions 7, 15.

In the position of the shaping mandril shown in FIG. 1, the shaping ring 13 is in a radially expanded state and its inner surface 35 bears under tension on the cylindrical surface 17 of the base part 7, the axial dimension of said surface corresonding to that of the shaping ring.

According to the invention, the metal shaping mandril portions 7 and 15 are constructed to be complementary on their cooperating, slidably engaging parts; the base part 7 (see FIGS. 2 and 4) comprises a conically declined surface 37 extending from said radial abutment 45 on the front end of the cylindrical surface 17 to the cylindrical surface 20; the surface 37 is provided with recesses 38 (see FIG. 4) extending over an axial distance larger than the axial dimension of the shaping ring 13 and as far as the surface 20, and with intermediate radially outwards extending ribs 39 (see also FIG. 4); the sleeve part 15 comprises an inner cylindrical surface 40 slidable over the cylindrical surface 20 of the base part, recesses 43 which extend as far as a corresponding conically declined inner surface 41 (see FIG. 2) and intermediate radially inwards projecting ribs 42.

The lagest radial dimension of said inner conical surface 41 of the sleeve part, which is smaller than the largest radial dimension of the outer surface 14 thereof, terminates near the profiled edge 21 in a radially interrupted abutment 44 which is formed by the edges of the ribs 42 and which cooperates with the radial abutment 45 on the base part which is interrupted by the end edges of the groove-like recesses 43 and which serves to limit the sliding movement of the sleeve part over the base part.

In order to enable removal of the shaping mandril 5 from the bell end 2 formed (see FIG. 2), first pressure medium is admitted into the cylinder 25 via a port 46, with the result that the piston 26, and hence the collar 32 on the piston rod, moves away from the flange 33 on the sleeve part, the clamping action between the shaping mandril portions 7, 15 and also the locking of the shaping ring 13 then being removed. The support of the cylinder 25 on the frame of the apparatus is then moved away from the clamping sleeve 4 together with the pressure ring 23 which is moved by the means 123 and the base part 7. The shaping ring, arrested by the opening 3 of the bell end formed and sliding over the surface 17 and the sleeve part 15 sliding over the surface 20 of the base part 7 remain within the bell end, a clearance being formed between the ribs 39 and 42 of the metal shaping portions 7 and 15 in which the shaping ring can retreat under radial contraction while sliding with its inner surface 35 over the conical outer surface 37 of the ribs 39; the shaping ring then assumes a smaller radial outer dimension until it is completely situated within the outer cylindrical surfaces 6 and 14 of the base part 7 and the sleeve part 15, respectively. Subsequently, by a further movement of the cylinder 25, the sleeve part 15 and the shaping ring 13 are also displaced, via the collar 32 on the piston rod 28, so that they are completely removed from the bell end. The shaping sleeve 24 is then folded open by the moving means 124, like the pipe clamp 4, after which the pipe with bell end can be removed.

The cylinder 25, together with the shaping mandril 5 and the pressure ring 23, is returned to the axial starting position. After that, the shaping ring is secured on the shaping mandril again by admitting pressure medium into the cylinder 25 via the port 34, with the result that the sleeve part 15, taken along by the collar 32 on the piston rod 28, abuts with its abutment face 44 against the front edge 22 of the shaping ring 13, thus pushing this ring along the conical outer surface 37 of the ribs 39 onto the base part 7; the shaping ring is locked in place again, in the axial and the radial direction and under radial expansion on the surface 17 of the base member 7.

What is claimed is:

1. A mandril assembly for shaping a radially enlarged interior region in a tubular material, comprising a base part, a shaping ring, a sleeve part and means for causing relative movement between the said base part and said sleeve part into operative and removal positions, said base part having at least a first surface having a first diameter less than an inside dimeter of said enlarged region, and a surface of lesser diameter than said first surface, said shaping ring being elastically stretchable and slidably mounted for axial movement on at least said surface of lesser diameter on said base part, said sleeve being coaxial with said base part and having an outer diameter at the most equal to said first diameter, in said operative position said shaping ring positioned on a surface of said base part such that an outer surface of the shaping ring has a diameter greater than said first diameter, in said removal position said shaping ring being axially moved with respect to said base part into a clearance between said surface of lesser diameter and said sleeve part such that said shaping ring contracts elastically over said surface of lesser diameter so as to have a maximum diameter less than said first diameter, whereby said mandril can be removed from the tubular material without disassembly after formation of the radially enlarged region.

2. A mandril assembly as claimed in claim 1, more particularly for shaping a bell end on thermoplastic pipe, wherein;
    said base part has an axis, said first surface is circular cylindrical and said first diameter is substantially equal to the outer diameter of the pipe;
    said base part comprises also a second cylindrical surface axially adjacent a front end of said first surface and having a radial dimension less than said first surface; an abutment surface conncting said end of said first surface and said second surface; and a third surface adjacent a front end of said second surface remote from said first surface, tapering inwardly away from said second surface, and having a plurality of recesses;

said shaping ring comprises also a front portion and a rear end, and is slidably mounted on said base part for axial movement on said second and third surfaces, in the operative position said ring being on said second surface with the rear end abutting said abutment surface of said base part, said front portion adjoining said front end of said second surface and tapering inwardly toward said conical surface of said base part, having a smallest diameter at a front end of the front portion at the most equal to the inner diameter of the pipe; while on said third surface in an elastically contracted position, the maximum diameter of the shaping ring being less than said first diameter;

said sleeve part comprises a fourth cylindrical surface having a diameter at least approximately equal to the outside diameter of the pipe and at the most equal to said first diameter; inwardly extending segments engaging said recesses of the conical portion of the base part, a rear end of a segment having an abutment surface for engaging said front end of the shaping ring; an inner surface between said segments having a diameter at least as great as the corresponding diameter of said third surface; and a front portion tapering inwardly from said fourth surface and having a least diameter at the most equal to the inner diameter of the pipe; and in said removal position, said third surface of the base part and said sleeve part are separated such that said shaping ring can slide to said elastically contracted position; in said operative position said abutment surface of said sleeve part abuts said shaping ring, said shaping ring being in an elastically expanded position, whereby said base part can be axially removed from the bell end of the pipe, the shaping part at first remaining still axially but contracting onto said third surface into a clearance that forms between said third surface and said sleeve part as said base part is moved axially with respect to said pipe and sleeve part, said mandril assembly then being removable axially from said pipe when said shaping part is in said elastically contracted position.

3. A mandril assembly as claimed in claim 2, wherein said second cylindrical surface is circular cylindrical and has a diameter less than said first diameter, said abutment surface of said base part comprises a conical surface, and the rear end of said shaping ring comprises a conical portion tapering from said fourth surface to a diameter less than said first diameter, such that in said operative position said rear portion abutting said concave abutment surface is restrained from radial outward movement in response to pressure on said front portion caused by insertion into a pipe.

4. A mandril assembly as claimed in claim 2, wherein said recesses in the third surface of said base part have end faces constituting an abutment for the abutment surfaces of said inner segments of said sleeve part, limiting displacement of said sleeve part upon relative movement into said operative position.

5. A mandril assembly as claimed in claim 2, wherein said shaping member comprises an elongated cylindrical spring member embedded near an innder surface of the shaping ring, major portions of said spring member extending axially.

6. A mandril assembly as claimed in claim 5, wherein said spring member consists of a spring wire formed in a closed wave line having constant length and amplitude, wave crests being near the front and rear edges of the shaping ring.

* * * * *